United States Patent [19]

Moskowitz et al.

[11] 4,171,818
[45] Oct. 23, 1979

[54] DYNAMIC LIP SEAL USING FERROFLUIDS AS SEALANT/LUBRICANT

[75] Inventors: Ronald Moskowitz, Merrimack, N.H.; Philip Stahl, Holliston, Mass.; Walter R. Reed, Merrimack, N.H.

[73] Assignee: Ferrofluidics Corporation, Burlington, Mass.

[21] Appl. No.: 784,036

[22] Filed: Apr. 4, 1977

[51] Int. Cl.² ............................................. F16S 15/56
[52] U.S. Cl. ...................................................... 277/80
[58] Field of Search ........................................... 277/80

[56] References Cited

U.S. PATENT DOCUMENTS

| | | | |
|---|---|---|---|
| 3,612,549 | 5/1970 | Berkowitz | 277/80 |
| 3,659,306 | 5/1972 | Stoltze et al. | 277/80 |
| 3,848,879 | 11/1974 | Hudgins | 277/80 |

FOREIGN PATENT DOCUMENTS 661042 1/1965 Belgium ........................................ 277/80

*Primary Examiner*—Robert I. Smith
*Attorney, Agent, or Firm*—Richard P. Crowley

[57] ABSTRACT

A seal for rotatable shafts utilizes a ferrofluid as a sealant and lubricant. As a sealant, the ferrofluid acts to exclude particulate matter from passing through the seal area contaminating internal mechanism elements, while as a lubricant, the ferrofluid forms a film between the shaft and the elastomer-material seal element; thus, cooling and lubricating the contact interface and acting to extend the life of the related components. The seal assembly has permanent magnetic elements which create a magnetic-field gradient, causing magnetic-field maxima at points immediately surrounding the contact point between the seal-elastomer material and the shaft. The ferrofluid is entrained magnetically within the interface region; thus, insuring continual lubrication of the contacting surfaces, while further, the entraining forces prevent leakage of the ferrofluid from the region.

9 Claims, 24 Drawing Figures

DYNAMIC LIP SEAL USING FERROFLUIDS AS SEALANT/LUBRICANT

BACKGROUND OF THE INVENTION

Ferrofluids are typically a colloidal dispersion of very finely-divided magnetic particles dispersed in a liquid, and are used, for example, in the construction of modular magnetic fluid seals and bearings (see, for example, U.S. Pat. No. 3,620,584, issued Nov. 16, 1971; U.S. Pat. No. 3,917,538, issued Nov. 4, 1975; and U.S. Pat. No. 3,977,739, issued Aug. 31, 1976 (all hereby incorporated by reference herein).

Ferrolubricants are a particular class of ferrofluids, wherein the liquid performs a lubricating function; that is, magnetizable lubricants that can be controlled and held in place by magnetic means. Ferrolubricants were developed because users of rotating and sliding mechanisms have always experienced problems in retaining lubricants at the critical wear or contact points.

Liquids, such as oil; for example, hydrocarbons, esters, silicones, etc., are the ideal lubricants; however, they do not tend to stay at or within the critical areas. It is even difficult to maintain them within the confines of the mechanism due to creep, gravity, centrifugation or other forces, generally leading to oil migration. When the oil migrates, the quantity left in the assembly or mechanism is reduced, thereby potentially reducing the life of the assembly. Another problem created by migration is contamination of adjacent areas where the oil is not desired, such as electrical connections, lenses, armatures, slip rings, etc.

Designers and engineers have attempted to overcome migration problems by using higher viscosity materials, commonly greases. Greases eliminate the contamination of adjacent areas due to migration, but often create new problems due to their high viscosity. For example, when used in rotating or sliding mechanisms, more torque is required to start and move the mechanism. The torque requirement does not remain constant in that grease, when left static, tends to take a set, resulting in high-starting torque. In addition, temperature increases often result when mechanical movement commences. This thermal increase in many cases will be high enough to deteriorate the lubricating properties of the grease. Also, the thermal increase changes the lubricant's viscosity, resulting in changing torque requirements which are very undesirable in precision mechanisms.

A lip seal is intended to provide a dynamic barrier about a rotating shaft which resists passage of contaminants (solid, liquid or gaseous) into the region which the lip seal is protecting. The lip seal may provide protection and separation of different environments at the same pressure or at different pressures, with the same or different environments. The lip seal provides protection by maintaining contact with the shaft as intimately as possible. This contact, however, is by no means hermetic, and, in fact, degrades in and with use by various mechanisms. When the seal is installed, it is usually provided with a coating of lubricant oil or grease. When the shaft rotates, this lubricant is then discharged from the contact area due to contact forces, centrifugation, heat (resulting in vaporization of the liquid lubricant), creep, gravity or migration caused by surface-energy phenomena. If the lubricant is not reapplied, the seal element breaks down due to heat of friction caused by rubbing, entrapment of abrasive particulate contamination in the contact region, or chemical reaction of the environment with the elastomer. Thus, improvements in dynamic lip seals are desirable to improve the sealing function of the seal, to retain lubricants in place, and to improve the use life of the seal.

SUMMARY OF THE INVENTION

The present invention relates to an improved dynamic lip seal employing ferrofluids and to a method of manufacturing and operating such lip seal. In particular, our invention concerns an improved dynamic lip seal which provides and retains lubrication at the contacting surface between an elastomer lip seal and a rotating shaft. More particularly, our dynamic lip seal comprises an assembly of a nonmagnetic elastomeric lip seal which contains a permanent magnet to maintain a magnetic field at contacting surfaces between the lip and a rotating shaft, and a ferrolubricant or ferrofluid maintained at the contacting surface by the magnetic field.

Our invention alleviates many of the prior-art problems and allows lip-seal users and manufacturers of rotating mechanisms to take advantage of the desirable characteristics of oil lubrication without the disadvantages of oil migration, the lack of lubrication in critical areas, and changing torque required to move the rotating mechanism.

Ferrofluidic hermetic seal technology is proven in many applications over the past ten years, but the seal has always been a rigid, noncontacting, focusing structure which retained the ferrofluid in an annulus between the pole piece and the rotatable shaft (see, for example, U.S. Pat. No. 3,620,584, supra). Our present invention unites the existing ferrofluidic hermetic seal technology with elastomeric lip seal technology; thus giving a seal with the most desirable characteristics of both. Our invention adds a permanent magnet material to the lip-seal assembly structure with the flexible elastomeric lip seal, and uses the properties of the magnetic field to retain permanently a reservoir of ferrofluid, particularly a ferrolubricant, in the assembly at the critical wear points.

In our invention, the surface contact of the elastomeric, nonmagnetic lip seal and the close proximity of the magnetic field of the magnet concentrate the ferrofluid lubricant at the lip-seal interface with the rotatable shaft. The ferrolubricant entrained at this region will be attracted to the point of greatest magnetic field strength, which may be designed to be concentrated at the most critical area of wear. The magnetic forces constantly retrieve any excess ferrofluid in the system, thereby eliminating any undesirable migration or loss of fluid. The magnetic source; that is, the permanent magnet, is contained within the seal envelope or assembly, and thereby minimizes or eliminates any need for dimensional change in existing equipment.

In our improved lip seal and assembly, no additional external permanent magnets, electrical current sources or extraneous hardware are required, while a totally hermetic seal is achieved. Further, our lip seal is self-healing, as the ferrofluid will be equally distributed in the lip region, due to magnetic forces in the fluid, and particulate contaminants are actually prevented from encroachment through the ferrofluid to the lip.

Construction of the seal can utilize a wide range of permanent magnet materials, including, but not limited to: the ALNICO series, rare earth magnets, ceramics, and plastic or rubber matrix magnets. Choices of such permanent magnet materials will depend upon the particular applications for the seal assemblies to which the present invention is to be applied.

The lip-seal element is typically a flexible, nonmagnetic lip element adapted to surround the rotating shaft, and often is composed of an elastomeric material. Material for the elastomer lip-seal element encompasses elastomers used currently in existing lip-seal assemblies; that is, nitrile, acrylonitrile, silicone, polyacrylic fluorocarbon, PTFE, and combinations of those and other presently utilized and contemplated elastomeric materials. The permanent magnetic material may be retained in place by various means, including integral molding of the magnetic material into the lip, itself, adhesive bonding to the lip, or using a garter spring or other fastening element or means to retain the magnetic material in the desired position. The elastomer may be open-cell foam and may act as a reservoir for the ferrofluid.

Our invention retards the life-limiting mechanism of conventional lip seals, and prevents loss of oil film between the lip and the rotatable shaft, admittance and inclusion of particulate contamination between the lip and the rotatable shaft, material failure of the elastomer caused by heat generated during operation with insufficient or no lubricant film, and loss of intimate contact between the lip and rotatable shaft resulting from imperfect manufacturing processes, accumulated tolerances, kinematic or dynamic effects, piece-part geometry or other sources of error.

In our lip-seal assembly and invention, the permanent magnetic material may be placed within the elastomeric lip seal, itself, or adjacently secured to the lip seal, or the magnetic material may be retained by a tension means, such as a spring, to the lip seal, or the magnetic material may be placed within the rotating shaft on which the lip seal is positioned. Our improved lip seal also includes the use of seals having a reservoir system or means for the ferrofluid. In the preferred embodiment, the ferrofluid is a ferrolubricant, so that it performs a lubricating as well as a sealing function for the lip seal.

Our invention will be described in connected with and illustrated by certain preferred embodiments; however, it is recognized that various changes and modifications may be made in such illustrated embodiments by those persons skilled in the lip-seal-assembly art without departing from the spirit and scope of the invention.

DESCRIPTION OF THE EMBODIMENTS

Referring to the figures of the drawings in each figure, 10 is a rotatable shaft about which the lip seal is positioned, 31 is an optional nonmagnetic housing to retain the lip seal in position about the shaft, 32 is an elastomeric lip seal which may be of conventional design or specially configured to perform to specific requirements or retain permanent magnet material of specific configuration, 33 is an elastomeric permanent magnet material which may be integally molded within the elastomeric lip material, adhesive-bonded or otherwise secured to the lip, the actual molded lip, itself, or retained in place with a radial tension spring or other fastening means, 34 is a ferrofluid lubricant which may be selected from a wide variety of such materials based on appropriate considerations of environment, temperature, duty, chemical compatibility, etc., 35 is a permanent-magnet button made of a high-energy material, 36 and 37 are garter-segmented radial springs or elastomeric O-rings, respectively, and are employed as an optional radial-force application element or elastomeric magnet-retaining element, 41 is an axially polarized permanent magnet ring or series of buttons made of high-energy magnetic material, 42 is a magnetic steel pole piece, 45 is a contoured permanent magnet, 46 is a porous foam elastomeric lip material; for example, an open-cell, flexible, plastic foam like urethane foam, and 51 is a porous foam, such as an elastomeric material. Elements 46 and 51 are utilized to retain an inventory of ferrofluid lubricant and to contact the rotatable shaft. Element 44 is an elastomeric permanent magnet insert which may be integrally molded into the lip or adhesive-bonded or otherwise intimately joined to the elastomeric lip-seal material 31, 49 is a radially polarized high-energy permanent magnet material, and 55 is a magnet material retained in place by interference-fit with garter spring 36.

Figure 1:
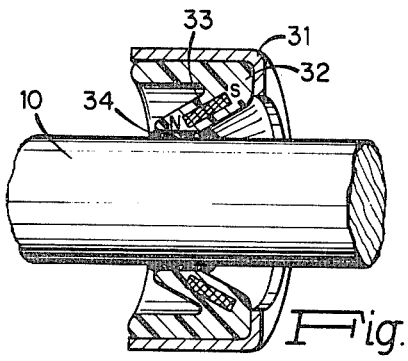
FIG. 1 is a schematic cross-sectional view of a lip-seal assembly of our invention with a permanent magnet integrally within the lip.

FIG. 1 shows a rotatable shaft 10, an elastomeric lip seal 32, with a lip in contact with the shaft 10 (the lip seal surrounding the shaft), the seal 32 retained in a housing 31, a permanent magnet 33 integrally contained within the seal 32, and a ferrolubricant held in position by the magnetic field in the top of the seal and the shaft to form a seal and act as a retained lubricant.

Figure 2A:
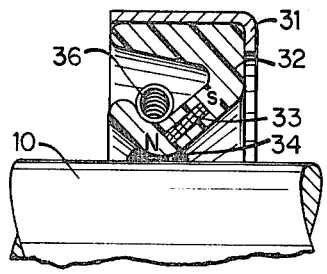
FIG. 2A shows a partial sectional view of a variation of the lip seal of FIG. 1 with a retaining garter.
Figure 2B:
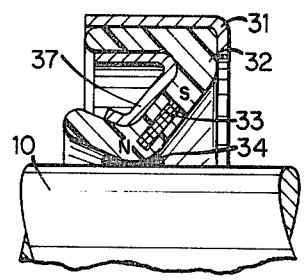
FIG. 2B shows a segmented retaining spring in place of the garter.

FIG. 2A shows our improved lip-seal assembly of FIG. 1, except with the employment of a coiled spring 36 about the periphery of the shaft 10 which tensionally urges the top end of the seal into contact with the shaft 10, while in FIG. 2B a segmented garter 37 is used for the same purpose and to retain the other end of the lip seal 32 in the housing 31.

Figure 3:
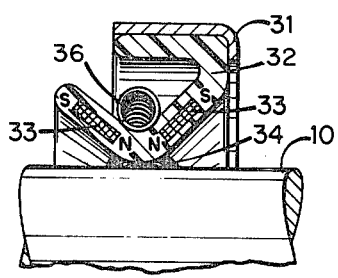
FIG. 3 is a schematic partial cross-sectional view of a variation of FIG. 1, but including two elastomeric permanent magnets and a retaining spring.

FIG. 3 shows a modification of FIG. 2A, with two permanent magnets 33 positioned within the seal 32 and on either side of the lip edge to concentrate the magnetic flux of both magnets in the shaft-lip-seal contact area.

Figure 4:
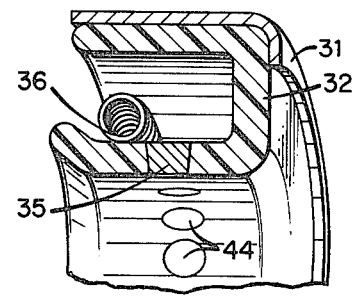
FIG. 4 shows, in a perspective partial cross-sectional view, a conventional lip seal with elastomeric permanent magnet inserts and an optional radial spring.

FIG. 4 shows, in a partial underside perspective view, a lip seal which has a series of button-like recesses molded therein, the recesses containing a button magnetic material 35 force-fitted, adhesively bonded or integrally molded therein to concentrate and retain the ferrolubricant (not shown) in the underside contact area of the lip seal with the shaft (not shown).

Figure 5:
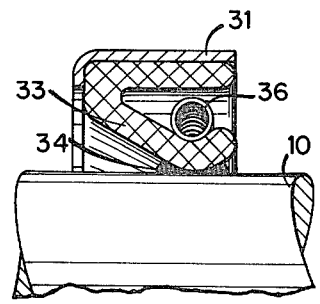
FIG. 5 is a schematic cross-sectional view of a lip seal molded of flexible permanent-magnet material with an optional radial spring.

FIG. 5 shows a lip seal similar to FIG. 1, except the lip-seal element 32, itself, is composed of a flexible permanent magnetic material, such as an elastomer having permanent magnetic particles dispersed therein.

Figure 6:
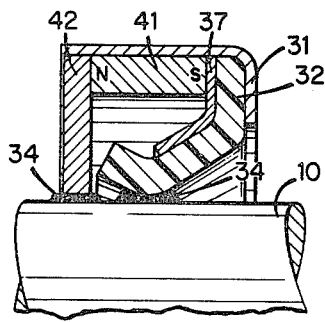
FIG. 6 is a schematic cross-sectional view of a ring magnet with one radial pole piece and a segmented spring used as a second pole piece, as well as a radial-force means on the lip.

FIG. 6 shows a ring magnet 41 adjacent the seal housing 31, with one radial magnetic pole piece 42 extending into close proximity at one end to the shaft 10, a segmented spring 37 retaining the lip seal 32 in the housing, and ferrofluid 34 retained and concentrated both at the end of the pole piece 42 as a seal and at the lip edge.

Figure 7:
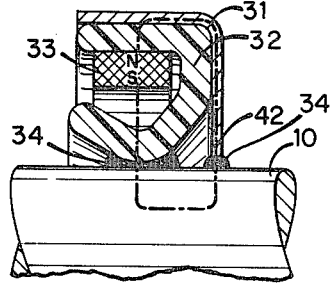
FIG. 7 is a schematic partial cross-sectional view of a radially polarized magnet, with side pole completing the magnetic circuit.

FIG. 7 shows a modification of FIG. 6 wherein a magnetic pole piece 42 is employed as a pole side arm adjacent the housing to complete the magnetic circuit or flux-flow path (dotted lines).

Figure 8:
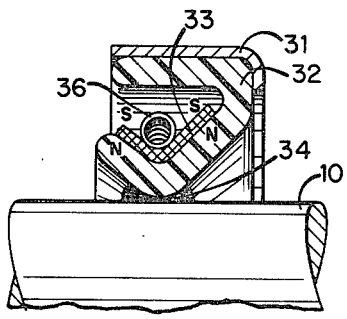
FIG. 8 is a schematic partial cross-sectional view of a conventional lip seal with an added, adhesively-bound elastomeric permanent magnet and an optional retaining spring.

FIG. 8 shows a conventional lip seal with a molded and secured elastomeric permanent magnet material 33 adhesively secured to the inside of the lip, and with a retaining spring to hold the lip edge in sealing contact with shaft 10.

Figure 9A:
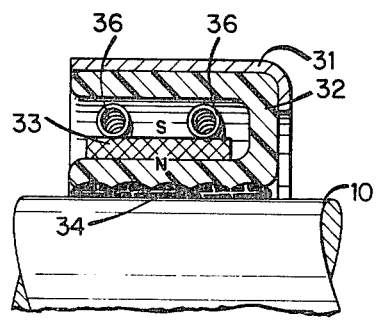
FIGS. 9A and 9B are schematic partial cross-sectional views with a scalloped, configured, contacting surface of the lip seal, FIG. 9A with optional radial garter springs and FIG. 9B with optional radial segmented spring.
Figure 9B:
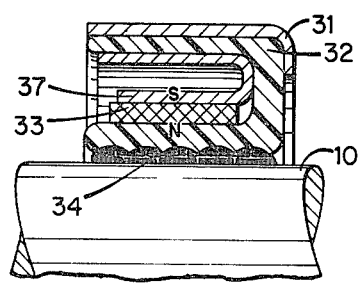

FIG. 9A shows a lip seal 32 of different configuration, with a plurality of edges, such as scalloped edges, illustrated with two retaining springs 36, with a permanent magnet 33 generally parallel to the shaft 10 and above the scalloped edges, so that a single magnet 33 serves as a common magnetic-flux source for the plurality of seals and lubricating seals formed with the shaft 10. FIG. 9B shows the same arrangement, but with the optional use of a segmented garter 37 as the retaining means for the lip seal 32 in the housing 31.

Figure 10:
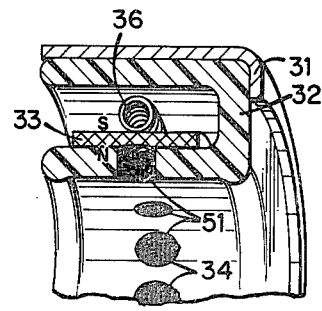
FIG. 10 is a perspective partial cross-sectional variation of FIG. 9A, with optional porous foam inserts saturated with ferrofluid.

FIG. 10 shows a seal as in FIG. 4, except in place of the button permanent magnet in the lip seal, there is placed an essentially open-cell foam material 51 saturated with a ferrofluid 34, with the retained permanent magnetic material 33 surrounding and above the lip seal.

Figure 11A:
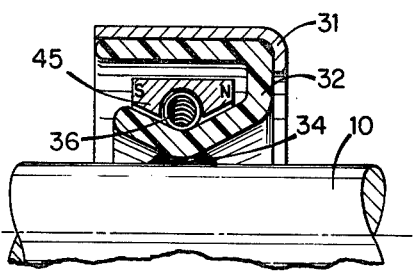
FIG. 11A is a schematic partial cross-sectional view of a lip seal, with permanent magnet sections of FIG. 11B retained by a snap-on mechanism to a garter spring.
Figure 11B:
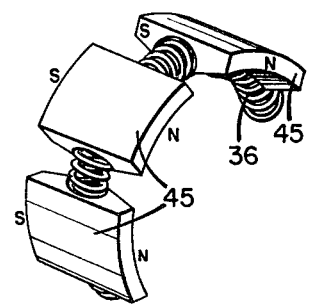
FIG. 11B is a schematic illustrative view of a plurality of permanent magnets and spring-retaining means.

FIG. 11A shows a modified lip seal with a contoured permanent magnetic material 45 as a series of magnets about the shaft, with the tension-retaining spring 36 positioned in the contour of the lower portion of the magnet, and FIG. 11B shows the magnetic pieces and the spring 37 passing therethrough.

Figure 12:
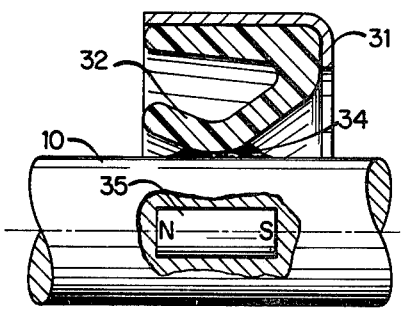
FIG. 12 is a schematic partial cross-sectional view of a conventional lip seal in place with respect to a rotatable shaft, which shaft has inserted within it a permanent magnet.

FIG. 12 shows an embodiment of our lip-seal assembly wherein the magnetic material 35 is placed within the shaft 10.

Figure 13A:
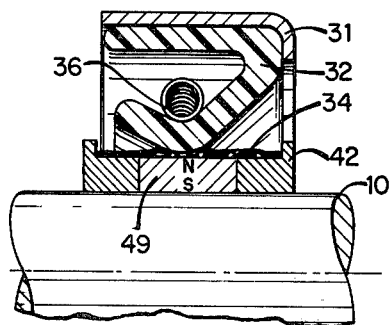
FIG. 13 is a schematic partial cross-sectional view of our lip seal, with A, B and C showing variations of positions of the magnetic material.
Figure 13B:
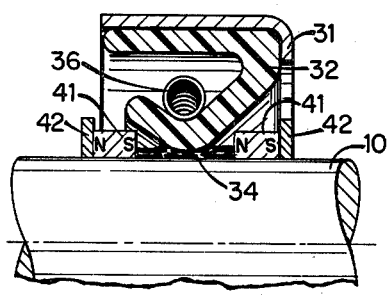

FIG. 13A shows a lubricant seal employing a magnetic steel pole piece 42 containing a magnet 49 therein secured to the shaft 10, with ferrofluid 34 concentrated at the lip edge and within the disk-like cavity formed by the outer periphery of the piece 42, with a retaining means 36 to place the lip seal in contact with the surface of piece 42. FIG. 13B is a modification of FIG. 13A, wherein two magnets 41 are secured on the shaft 10 between pieces 42 to retain the ferrofluid 34 therebetween, with the lip seal in contact with the shaft 10 and sealed by concentrated ferrofluid 34.

Figure 13C:
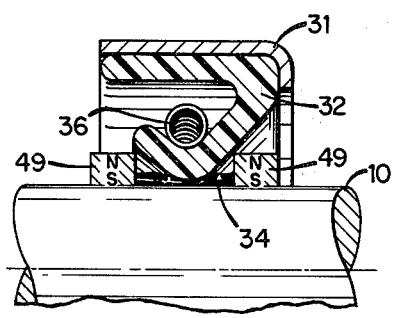

FIG. 13C is a further modification of FIG. 13B, wherein the end pieces 42 are omitted and the ferrofluid 34 is retained between and concentrated by two end permanent magnets 49.

Figure 14A:
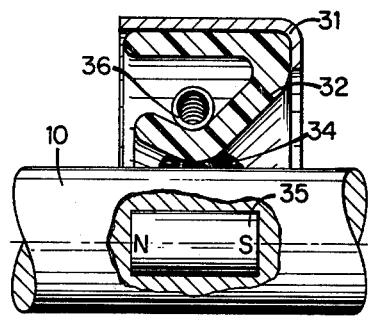
FIGS. 14A and 14B are schematic cross-sectional views, with FIG. 14A showing an optional garter spring, and FIG. 14b showing an optional segmented radial spring, both with a magnet retained within the shaft.
Figure 14B:
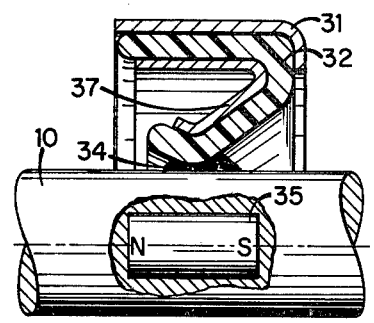

FIGS. 14A and 14B are modifications of FIGS. 1 and 2, but with the permanent magnet material secured within the rotatable shaft 10.

Figure 15A:
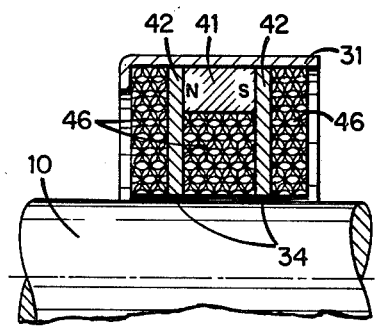
FIGS. 15A and 15B are schematic cross-sectional views which show a ring magnet and two radial pole pieces with porous foam saturated with ferrofluid as lip-seal components in two different reservoir arrangements.
Figure 15B:
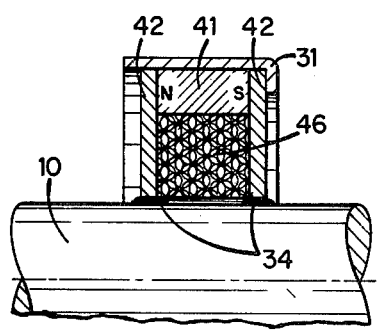

FIG. 15 shows an embodiment wherein a ferrofluid reservoir is employed, wherein in FIG. 15A porous open-cell foam material 46 with ferrofluid therein is retained between side and pole pieces 42, with a permanent magnet 45 supplying common magnetic flux to the pole pieces, and ferrofluid 34 forming a lubricant seal at the end of the pole pieces 42 and resupplied by the ferrofluid in the saturated foam 46. FIG. 15B shows a modification wherein the side foam elements of FIG. 15A are omitted.

Figure 16:
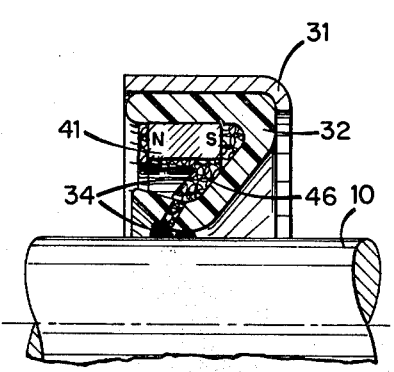
FIG. 16 is a schematic cross-sectional view of an axially polarized magnet in the lip housing and porous foam which conducts ferrofluid to the interface between the lip and rotatable shaft.

FIG. 16 shows a radial permanent magnet 41 within the lip housing 31 and the lip seal 32, with a porous open-cell foam saturated with ferrofluid 46 on the inside of the lip seal and conducting and supplying ferrofluid from the reservoir in the foam to the interface between the edges of the lip seal 32 and the shaft 10.

Figure 17:
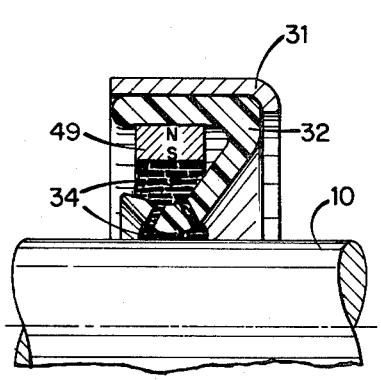
FIG. 17 is a schematic cross-sectional view of a radially polarized magnet in the lip-seal housing which retains ferrofluid inventory, and allows the ferrofluid to reach the interface of the lip and rotatable shaft through an orifice or multiple orifices in the molded lip.

FIG. 17 shows a modified lip-seal assembly wherein the molded lip seal has multiple orifices therein to permit the passage of ferrofluid 34 from the inside of the lip seal to the interface area between the lip seal and the rotatable shaft 10.

In the conventional radial lip seal for a rotatable shaft, cooling and lubricating for the lip is ideally accommodated by a film of lubricating oil when possible. In our invention, this function is accomplished by the ferrolubricant.

Another aspect of our invention is the incorporation of a magnetic field within the seal assembly to entrain the ferrolubricant 34 in the contact and wear region, as is illustrated in the various FIGS. 1–17. Our seals prevent leakage of other fluids into the wear region and also act to exclude particulate contaminants, particularly those which are nonmagnetic. The inclusion of permanent magnet materials within the radial lip-seal assembly may be achieved within the present envelope of most lip-seal assemblies. A major advantage of the present invention is the fact that our seals may be retrofitted into present applications without modification of the related hardware. Further, the invention may be incorporated in present production facilities with a minimum of tooling addition and almost no tooling modification.

Our invention as illustrated thus includes a number of factors. A low-viscosity magnetic-fluid film may be entrained about a rotating shaft member by virtue of a magnetic-gradient force sufficient to achieve the entraining action, while with conventional lip seals, such low-viscosity film would not provide suitable long-term protection due to migration. Also, an inventory of ferrofluid is made available for replacement within the contact region and may be retained in intimate proximity to the contact region, such as by the use of porous ferrofluid-saturated foam materials.

The geometry of a seal mechanism, after being provided with the present invention, may maintain the same geometry as the comparable prior mechanism. This is accomplished by the utilization of a magnetized material which may be integrally formed with existing components or added into unused volume within the present seal envelope. The flux density resulting from the magnetic gradient has a maxima proximate to the contact interface of the lip of the seal with the rotatable shaft 10. This maxima may be a continuum around the circumference of the rotatable shaft as illustrated or may be a discrete number of maxima as in the seal of FIG. 14.

A suitable ferrolubricant for use in our invention may be represented by ferrolubricants manufactured by Ferrofluidics Corporation and specified and known as a synthetic hydrocarbon P-02 or fluorocarbon F-08. In the event that an elastomeric permanent magnet is to be used as the magnet material, it may be of the type known as Plastiform, a trademark of and manufactured by the 3M Company of Minnesota.

In order to assemble the present seal assembly, the ferrolubricant need only be applied by painting it on the rotatable shaft 10 and radial lip 32 at assembly or at a point of fabrication, or be provided within the porous foam which could be saturated at the point of fabrication.

As a result of our invention, an improved mechanism for sealing rotatable shaft members is achieved, wherein ferrolubricant is utilized to effect superior lubrication qualities to the lip-seal assembly and operation.

What we claim is:

1. In combination with a magnetically permeable shaft element, a radial lip-seal assembly adapted to seal hermetically the magnetically permeable shaft element, which lip-seal assembly includes:
   (a) a lip-seal external housing element;
   (b) an elastomeric, flexible, nonmagnetic, lip-seal member within the housing and surrounding peripherally the shaft element;
   (c) means to urge radially a selected area of the lip-seal element into a close, contacting, sealing arrangement with and about the peripheral surface of the shaft element to define a radial interface contact area;
   (d) a permanent magnetic ring element extending radially about the shaft element, to provide a peripheral magnetic-flux field about the shaft element, the magnetic element having a one end having one magnetic polarity and another end having an opposite magnetic polarity, the magnetic polarity of the one or the other end of the magnetic element so positioned to concentrate the magnetic flux from said end toward and at the interface contact area, the magnetic flux so concentrated passing through at least a portion of the elastomeric nonmagnetic lip seal at the interface area; and
   (e) a ferrolubricant concentrated by the magnetic flux from the magnet element through the nonmagnetic lip-seal member and entrained about the interface contact area, to provide a continuous dynamic lubricant seal between the moving shaft element and the interface area of the lip-seal element.

2. The lip-seal assembly of claim 1 wherein the permanent magnet element comprises a plurality of permanent magnets molded within the internal structure of the lip-seal element spaced about the periphery of the shaft.

3. The lip-seal assembly of claim 1 wherein the magnet element comprises a permanent magnet ring element within the housing element and surrounding the periphery of the shaft and spaced apart from the interface area, and which includes at least one pole piece coupled magnetically to one end of the permanent magnet element, and with one end of the magnetically coupled pole piece disposed to concentrate the flux density from the one end of the magnet element at or about the interface area.

4. The lip-seal assembly of claim 3 wherein the magnet element is spaced apart from and generally parallel to the shaft, and which includes first and second pole-piece elements, each pole piece magnetically coupled to one or the other end of the permanent magnet element, the first pole piece extending radially toward and into a close noncontacting relationship with the shaft element, and the other pole piece extending toward the interface area on the opposite side of and in contact with the lip seal from the interface area, to retain the lip seal in position and to concentrate the flux at the interface contact area, and which lip-seal assembly inludes a ferrofluid to seal hermetically the space between the shaft and the end of the first pole-piece element.

5. In combination with a magnetically permeable, movable, shaft element, a lip-seal assembly which includes:
   (a) a lip-seal external housing element;
   (b) an elastomeric, flexible, nonmagnetic, lip-seal member within the housing and peripherally surrounding the shaft element;
   (c) means to urge radially a selected area of the lip-seal element into a close, contacting, sealing arrangement with and about the peripheral surface of the shaft element to define a radial interface contact area;
   (d) an annular, permanent magnet element extending radially about the shaft element and having a pole of one magnetic polarity at one end and a pole of opposite magnetic polarity at the other end of the annular magnet element;
   (e) a fist magnetic pole piece magnetically coupled to the one end of the magnet element and extending generally radially toward the shaft element and into a close, noncontacting relationship with the surface of the shaft element, to define a sealing area and to concentrate magnetic flux from the one end of the magnet element at the extending end of the first pole piece and into the sealing area;

(f) a ferrofluid magnetically concentrated and retained in the sealing area, to form a hermetic seal between the one extending end of the first pole piece and the surface of the shaft element;

(g) a second magnetic pole-piece element magnetically coupled to the other end of the annular magnet element and extending generally radially toward the shaft element, the extending end of the second pole-piece element positioned and in contact with and separated by the nonmagnetic lip-seal member in the interface contact area, to concentrate magnetic flux from the other end of the magnetic element at the extending end of the second pole piece and through the nonmagnetic lip seal into the interface contact area; and (h) a ferrolubricant magnetically concentrated and retained at or about the interface contact area of the lip seal, to provide sealing and lubrication in the interface contact area during shaft movement, the magnetic-flux flow path forming a flow circuit extending between the one end of the magnet element through the first pole piece, the ferrofluid, the shaft element, the ferrolubricant, the nonmagnetic lip seal, the second pole piece and the other end of the magnet element.

6. The lip-seal assembly of claim 5 wherein the magnet element comprises a single, permanent, ring magnet element within the housing and peripherally surrounding and spaced apart from the shaft, the axis of the magnet element substantially parallel with the axis of the shaft.

7. The lip-seal assembly of claim 6 wherein the first pole-piece element comprises a radial, magnet, pole-piece element extending generally perpendicular to the axis of the shaft, with one end of the first pole-piece element in contact with one end of the ring magnet element, and the other end adapted to extend radially into a close noncontacting relationship with the shaft to define the sealing interface area.

8. The lip-seal assembly of claim 7 wherein the second pole-piece element comprises a tension-biased element in contact with the other end of the magnet element and which acts as a radial directing force on the lip-seal element to urge the lip-seal element radially inwardly toward the shaft element, and the one end of which the second pole-piece element extends generally adjacent to, in contact with and on the opposite surface of the lip seal, the end thereof extending generally above the lip-seal lubricant interface area to concentrate magnetic flux through the elastomeric lip-seal element into the lubricant interface area.

9. The lip-seal assembly of claim 5 wherein the first pole-piece element comprises a part of the external housing element.

* * * * *